United States Patent [19]
Baran et al.

[11] Patent Number: 5,446,807
[45] Date of Patent: Aug. 29, 1995

[54] PASSBAND-FLATTENED ACOUSTO-OPTIC POLARIZATION CONVERTER

[75] Inventors: Jane E. Baran, Metuchen, N.J.; Antonio d'Alessandro, Roma, Italy; Janet L. Jackel, Holmdel, N.J.

[73] Assignee: Bell Communications Research, Inc., Livingston, N.J.

[21] Appl. No.: 264,673

[22] Filed: Jun. 23, 1994

[51] Int. Cl.⁶ .......................... G02B 6/12; G02B 6/26
[52] U.S. Cl. ........................................ 385/11; 385/7; 385/9; 385/14; 385/16; 385/30; 385/40; 385/41
[58] Field of Search ................ 385/1, 2, 7, 8, 9, 11, 385/14, 15, 16, 24, 30, 31, 40, 41, 132; 359/285, 286, 287, 301, 305, 308, 322, 323

[56] References Cited

U.S. PATENT DOCUMENTS

| | | | |
|---|---|---|---|
| 3,208,342 | 9/1965 | Nethercot, Jr. | 385/40 X |
| 3,850,503 | 11/1974 | Riseberg et al. | 385/41 X |
| 3,909,108 | 9/1975 | Taylor | 385/40 X |
| 4,008,947 | 2/1977 | Baües et al. | 385/9 X |
| 4,312,562 | 1/1982 | Segawa et al. | 385/40 X |
| 4,387,353 | 6/1983 | Giallorenzi et al. | 385/7 X |
| 4,433,895 | 2/1984 | Puech et al. | 385/40 X |
| 4,645,293 | 2/1987 | Yoshida et al. | 385/40 X |
| 5,002,349 | 3/1991 | Cheung et al. | 385/14 X |
| 5,133,028 | 7/1992 | Okayama et al. | 385/11 |
| 5,133,029 | 7/1992 | Baran et al. | 385/11 |
| 5,218,198 | 6/1993 | Bristow et al. | 385/41 X |
| 5,218,653 | 6/1993 | Johnson et al. | 385/11 |

OTHER PUBLICATIONS

*Introduction to Modern Optics*, 2nd ed., Grant R. Fowles, (Holt, Rinehart and Winston, Inc., 1975), pp. 138–139.

*Surface-Wave Devices for Signal Processing*, David P. Morgan (Elsevier, 1985), pp. 61–64.

"Optical Directional Couplers with Weighted Coupling", R. C. Alferness, *Applied Physics Letters*, vol. 35, 1979, pp. 260–262.

"Guide-Wave Acousto-Optic Tunable Filters Using Simple Coupling Weighting Technique," Y. Yamamoto, C. Tsai and K. Eiseghamat, *Proceedings of 1990 IEEE Ultrasonics Symposium*, 1990, pp. 605–608.

"Integrated-Optic Devices on LiNbO₃ for Optical Communication," E. Voges and A. Neyer, *Journal of Lightwave Technology*, vol. LT. 5, No. 9, Sep. 1987, pp. 1229–1238.

"Integrated Optical Acoustically Tunable Wavelength Filter," J. Frangen, H. Herrmann, R. Ricken, H. Weibert, W. Sohler, E. Strake, *Electronics Letters*, Nov. 9, 1989, vol. 25, No. 23 pp. 1583–1584.

"Integrated Acousto-Optical Mode-Convertors with Weighted Coupling Using Surface Acoustic Wave Directional Couplers," H. Hermann and St. Schmid, *Electronics Letters*, May 21, 1992, vol. 28, No. 11, pp. 979–980.

*Primary Examiner*—Brian Healy
*Attorney, Agent, or Firm*—Leonard Charles Suchyta; Stephen M. Gurey; James W. Falk

[57] ABSTRACT

A passband-flattened acousto-optic polarization converter (100) in which two acoustic waveguides (14, 20) are formed in a substrate and a separated by a small gap (18) such that the two acoustic waveguides act as a directional coupler in which acoustic power is transferred back and forth. An interdigitated transducer (12) launches a surface acoustic wave in the first acoustic waveguide, and an optical waveguide is formed in the middle of the second waveguide. A partial acoustic absorber (27) is formed over both acoustic waveguides at a crossover length at a distance from the transducer equal to the point at which the acoustic wave has transferred from the first to the second waveguides and back again. The partial absorber absorbs most of the acoustic amplitude with the attenuated acoustic amplitude being coupled back again to the second acoustic waveguide but at an opposite sign. A complete absorber (26) is formed over both acoustic waveguides at a distance from the transducer equal to approximately twice the crossover length such that the attenuated acoustic wave following the partial absorber and transferred to the second acoustic waveguide again transfers back to the first acoustic waveguide. The optical signal is exposed to an acoustic signal that increases to a maximum, decreases and then increases and decreases again with a smaller magnitude and reversed sign. The resultant frequency response has a significantly flattened shape for improved performance of the converter for use as a an optical switch or filter.

13 Claims, 5 Drawing Sheets

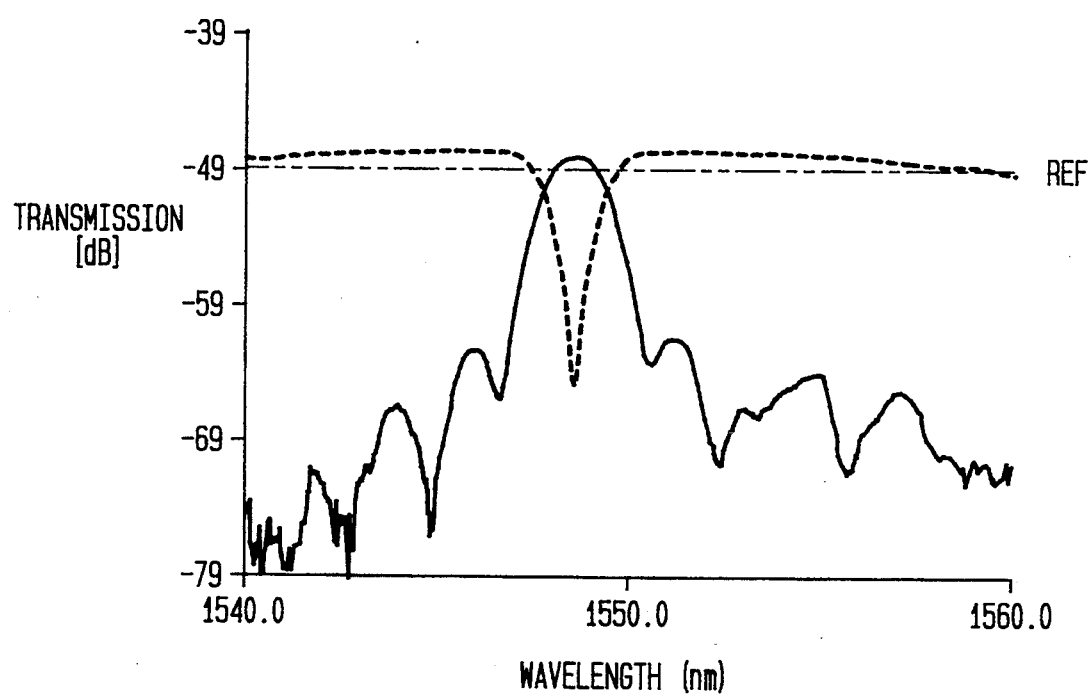
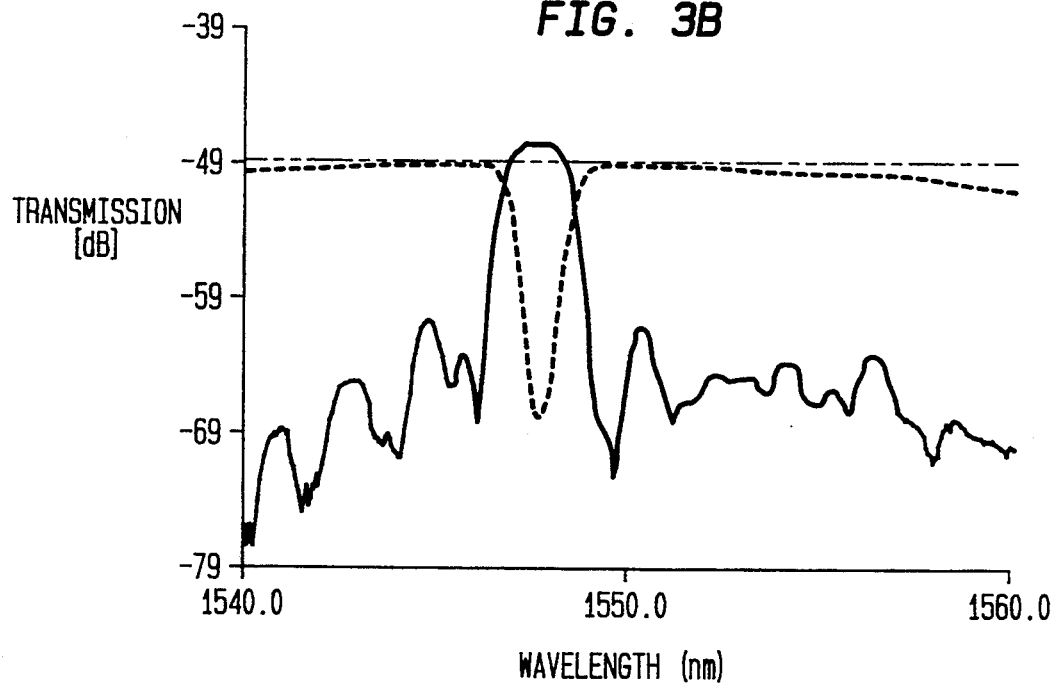

PASSBAND-FLATTENED ACOUSTO-OPTIC POLARIZATION CONVERTER

GOVERNMENT RIGHTS

This invention was made with Government support under Agreement No. MDA972-92-H-0010 awarded by DARPA. The Government has certain rights in the invention.

BACKGROUND OF THE INVENTION

This invention relates to acousto-optic polarization converters, such as acousto-optic filters.

An acousto-optic filter is one example of an acousto-optic polarization converter. In such a converter, a transducer of interdigitated electrodes is formed at the surface of piezo-electrical material and is electrically driven by an RF-frequency signal to launch an acoustic wave at the surface of the material. The surface acoustic wave acts as a periodic index grating for input optical radiation, and it provides for quasi-phase-matched conversion between orthogonally polarized eigenstates having substantially different refractive index. The interaction rotates the polarization of that wavelength of light for which the momentum mismatch between polarization states nearly exactly matches the acoustic wave momentum. Placing the converter between crossed broadband polarizers allows it to operate as a narrow-band acousto-optic tunable filter (AOTF).

Many of the early AOTFs relied on bulk acoustic waves and required large amounts of RF power. More recent devices have reduced the power levels by launching only a surface acoustic wave, by using an acoustic waveguide to guide the surface acoustic wave along only a limited cross-section of the surface, and by using an optical waveguide so that the surface acoustic wave need only interact with the light over a limited cross-section. By combining these refinements, the RF power consumption of AOTFs has been reduced to less than 10 mW/channel, allowing for their practical use in many applications. For example, an AOTF is envisioned for filtering one or more channels of a wavelength-division multiplexing (WDM) optical communication system. Filtering of multiple channels multiplies the RF power applied to the AOTF, thus increasing the thermal problems as well as severely limiting the channel capacity. Finally, for commercial telephone usage, the RF power must be minimized to reduce cost.

Acousto-optic converters further suffer from relatively high-intensity frequency side lobes. Although the central lobe can be made as wide or narrow as desired, the intensity of the side lobes remains proportionally constant in most designs. For a single-stage abrupt turn-on AOTF, the first side lobe is typically reduced by only 10 dB from the resonance. High side lobes reduce the filtering effectiveness by causing optical leakage between neighboring wavelength channels, and they impose design constraints on the use of an AOTF in a WDM system. Cheung et al. disclose in U.S. Pat. No. 5,002,349, incorporated herein by reference, a multi-stage AOTF having reduced side lobes. However, the serially connected multiple stages need to be acoustically isolated from each other. Therefore, their AOTF needs multiple transducers and extends over a substantial length. This design increases cost and introduces processing variations between different portions of the AOTF. Furthermore, a severe type of crosstalk, called coherent crosstalk, is not significantly reduced by serially connecting two filters with high side lobes.

Fowles defines apodization in the text *Introduction to Modern Optics*, 2nd ed. (Holt, Rinehart and Winston, Inc., 1975), pp. 138–139 as "any process by which the aperture function is altered in such a way as to produce a redistribution of energy in the diffraction pattern." He shows that the diffraction pattern through an apodized slit reduces spatial side lobes. Morgan discusses apodized transducers in surface-wave devices in his treatise *Surface-Wave Devices for Signal Processing* (Elsevier, 1985), pp. 61–64. His apodized launching transducer has interdigitated electrodes having an overlap between neighboring electrodes that varies along the direction in which they launch the surface acoustic wave. The frequency response of the device depends on the details of the apodization. Alferness discloses an optical directional coupler in "Optical directional couplers with weighted coupling," *Applied Physics Letters*, volume 35, 1979, pp. 260–262 in which two optical waveguides forming an optical directional coupler approach each other across a precisely chosen gap or interaction region that varies in a carefully chosen manner. He is thereby able to reduce the size of the frequency side lobes. He obtains his best results with a Hamming function taper of the gap although raised cosine tapering is also effective.

Yamamoto et al. have proposed an apodized acousto-optic converter in "Guide-wave acousto-optic tunable filers using simple coupling weighting technique," *Proceedings of 1990 IEEE Ultrasonics Symposium*, 1990, pp. 605–608. The apodization is achieved by tapering the acoustic waveguide, in the middle of which runs an optical waveguide. The varying cross-section causes the acoustic energy density in the acousto-optic interaction region to begin at a small value, increase slowly to a maximum value, and thereafter decrease. However, this technique has been determined to be is difficult. If the acoustic power is to be gradually concentrated in the narrowing acoustic waveguide, the acoustic wave must be adiabatically compressed rather than scattered into the substrate. Experience has shown that the acoustic wave is scattered in a reasonably fabricated acoustic waveguide. If the acoustic power is to be gradually concentrated in the narrowing acoustic waveguide, the acoustic wave must be adiabatically compressed or else a great deal of energy is lost as higher-order modes exceed the waveguide cutoff frequency and leak into the substrate. Adiabatically tapered waveguides have proven difficult to fabricate.

Johnson et al. disclose in U.S. Pat. No. 5,218,653, incorporated herein by reference, a polarization converter with an apodized acoustic waveguide in which a surface acoustic wave is launched in one surface acoustic waveguide which is directionally coupled to a second surface acoustic waveguide in the middle of which runs an optical waveguide. The interaction length in the second acoustic waveguide is such that the power density of its acoustic wave spatially varies from minimum to a maximum and back to a minimum. Thereby, the acoustic energy in the second acoustic waveguide is apodized and the side lobes of the interaction with the optical signal are reduced.

One major shortcoming of the prior art AOTFs has been the shape of their passband. The most desirable passband has unity transmission over the wavelength to be passed, and zero transmission elsewhere; the corresponding rejection band is both deep and broad, i.e., essentially no light is transmitted into unselected channels. Such a passband can accommodate the inevitable variations in signal wavelength, and will not narrow when several filters are used in series. While consideration of the benefits of passband flattening have concentrated on the cross state transmission characteristics, the bar state depletion can be even more important when the AOTF is used as a switch rather than as a filter. A small increase in cross state loss results in a large increase in bar state crosstalk, e.g., a 0.5 dB loss corresponds to a −10 dB crosstalk.

While an ideal passband cannot be achieved, schemes to create nearly-ideal passbands have been proposed. Song discloses in co-pending U.S. patent application, Ser. No. 08/131,522, filed Oct. 1, 1993, now U.S. Pat. No. 5,400,171, Mar. 21, 1995, an acousto-optic filter with near-ideal bandpass characteristics. The near-ideal bandpass characteristics are achieved through an acousto-optic interaction profile that has a damped oscillating shape. Realization of these nearly perfect filters requires, however, more detailed control of the acousto-optic interaction than can be easily achieved using currently available techniques.

SUMMARY OF THE INVENTION

The present invention is a passband-flattened apodized acousto-optic polarization converter that is based on an extension and modification of the aforenoted prior art polarization converter with apodized acoustic waveguide, disclosed in U.S. Pat. No. 5,218,653.

In accordance with the present invention, passband flattening is achieved by introducing a region in which the sinusoidally varying acoustic amplitude is both phase-reversed and diminished. This is accomplished by placing a partial absorber, rather than a complete absorber as in the prior art filter, at a crossover length, $L_x = L_c/2$, where $L_c$ is the coupling length of the waveguide. The total interaction length of the filter need thus be greater than $L_x$, the length of the prior art apodized converter, and preferably close to $2L_x$. In the converter of the present invention, therefore, a surface acoustic wave (SAW) is launched in one surface acoustic waveguide which is directionally coupled to a second surface acoustic waveguide in the middle of which runs an optical waveguide. In the acousto-optic interaction region, acoustic amplitude is thus transferred from the first acoustic waveguide to the second acoustic waveguide and back to the first, where all but a small part is absorbed. That signal part, which is phase reversed, is then coupled back to the second acoustic waveguide and then back again to the first acoustic waveguide where it is all absorbed at the end of the interaction length.

BRIEF DESCRIPTION OF THE DRAWING

FIG. 3A shows measured cross state and bar state transmissions for the prior art apodized converter, and FIG. 3B shows measured cross state and bar state transmissions for the passband-flattened converter of the present invention;

DETAILED DESCRIPTION

Figure 1:
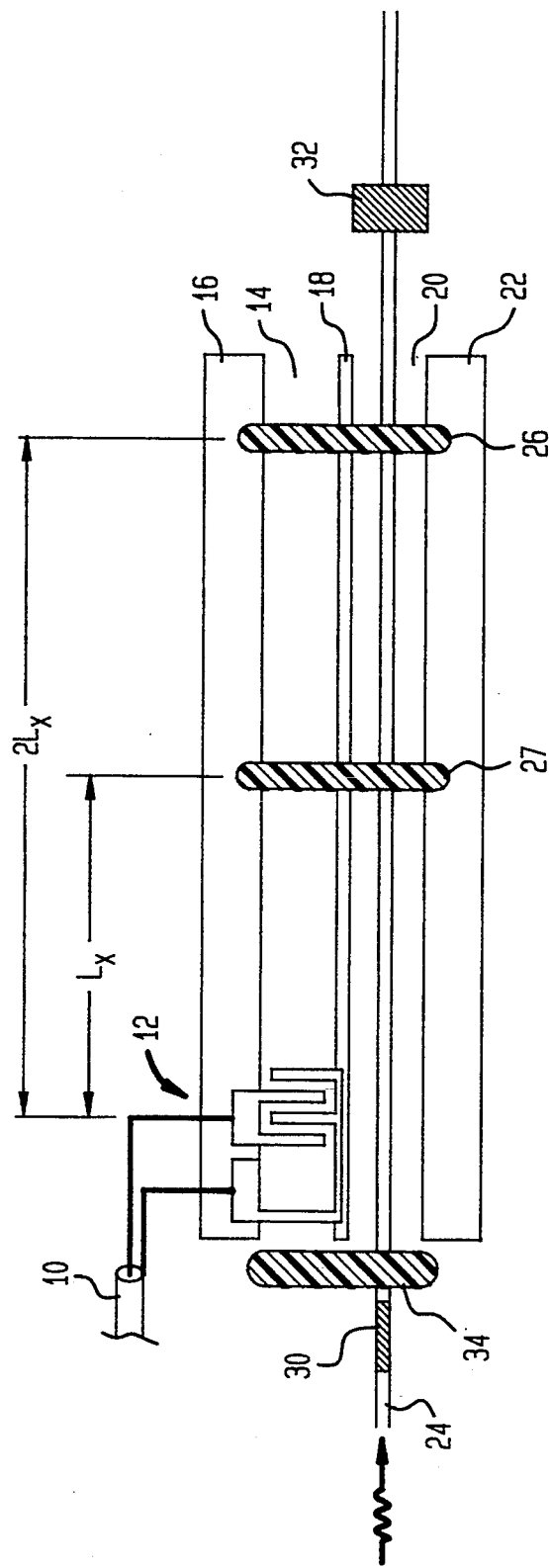
FIG. 1 is a plan view of an embodiment of the invention.

An embodiment of the polarization converter 100 of the present invention is illustrated in plan view in FIG. 1. A coaxial line 10 feeds an RF signal through a suitable unillustrated matching network to an interdigitated transducer 12, which launches a surface acoustic wave in a launching acoustic waveguide 14 which it overlies. The launching acoustic waveguide 14 is defined on one side by a surface acoustic wave barrier 16 and on the other side by a narrow surface acoustic wave gap 18 separating it from an interaction acoustic waveguide 20, defined on its other side by another surface acoustic wave barrier 22. An optical waveguide 24 runs through the middle of the interaction acoustic waveguide 20 and receives an optical signal to be converted by the RF signal.

Each of the acoustic waveguides 14 and 20 is single moded, and acoustic amplitude is transferred from the launching waveguide 14 to the interaction waveguide 20, as a function of the axial distance x according to the equation $$A(x) = A_{in} \sin(2\pi x / L_c) \quad (1)$$

That is, acoustic power is gradually transferred into the interaction waveguide 20 and, after reaching a maximum, is transferred back to the launching waveguide 14. The coupling coefficient, equal to $2\pi/L_c$, depends exponentially on the gap 18 between the two waveguides because the evanescent surface acoustic wave decays exponentially into the gap 18. The coupling length, $L_c$, is defined as the length required for the acoustic amplitude to cross-over from the first waveguide to the second and return to the first and to cross-over and return again with a 180° shift in phase. $L_c$ is a function of the width of the acoustic waveguide regions 14 and 20, the separation of the waveguides defined by the gap 18, and how strongly the acoustic waveguides are confined by the barrier regions 16 and 22. The converter geometry, and from that the coupling length $L_c$, is chosen to give the desired passband width, $\propto 1/L_c$. For a given physical waveguide geometry, $L_c$ can be measured by an acoustic profilometer.

In the prior art apodized polarization converter, a complete acoustic absorber is placed at a crossover length, $L_x = L_c/2$, and the total length of the filter need not be longer than $L_x$.

In the polarization coverter of the present invention, on the other hand, a partial absorber 27 is positioned over the waveguides 14 and 20 at a distance from the transducer 12 equal to the crossover length, $L_x$, equal to $L_c/2$, so that the acoustic amplitude in the interaction waveguide becomes $$A(x) = A_{in} \sin(2\pi x / L_c) \quad x \leq L_x \quad (2)$$

$$A(x) = \delta A_{in} \sin(2\pi x / L_c) \quad x > L_x \quad (3)$$

where δ is the small fraction of acoustic amplitude not absorbed by the partial absorber 27. It can be noted that the acoustic amplitude has reversed sign in the section after $x = L_x$. A complete acoustic absorber 26 is positioned over waveguides 14 and 20 at a distance from the transducer 12 equal to $2L_x$, resulting in a converter having an interaction length twice as long as the prior art apodized polarization converter. An additional acoustic absorber 34 is positioned in back of transducer 12 to prevent a back-propagating surface acoustic wave.

From equations (2) and (3) it can be seen that along the $2L_x$ interaction region of the interaction waveguide, the acoustic amplitude slowly increases to a maximum and then decreases, passing through zero, and then increases and decreases a second time, but with opposite phase and decreased magnitude. Thus, unlike the prior art converter in which the acoustic power is coupled from the launching waveguide to the interaction waveguide and then back to the launching waveguide where it is completely absorbed, the acoustic power in the converter of the present invention is coupled from the launching waveguide to the interaction waveguide and back to the launching waveguide where all but a small portion is absorbed with the remaining portion being coupled back again to the interaction waveguide and then back again to the launching waveguide where it is finally all absorbed.

As in the prior art converter, the acousto-optic converter of the present invention converts the polarization of the light traveling on the optical waveguide 24 and having an optical frequency corresponding to the RF frequency impressed on the transducer 12. That is, the RF frequency determines the optical frequency of the converted light. Such a converter can be made into an electrically tunable filter by positioning an input polarizer 30 on one side of the converter and an output polarizer 32 of the opposite polarization on the opposite side. Such polarizers are disclosed by Cheung et al. in their aforenoted patent and Baran et al. in U.S. Pat. No. 5,133,029. Only the light having its electrically selected polarization converted to the transverse polarization passes both polarizers 30 and 32. Alternatively, if the output polarizer is replaced with a polarization beam splitter (not shown), the device functions as a switch, directing the polarization transformed wavelengths to one port and the untransformed wavelengths to the other port.

Figure 2A:
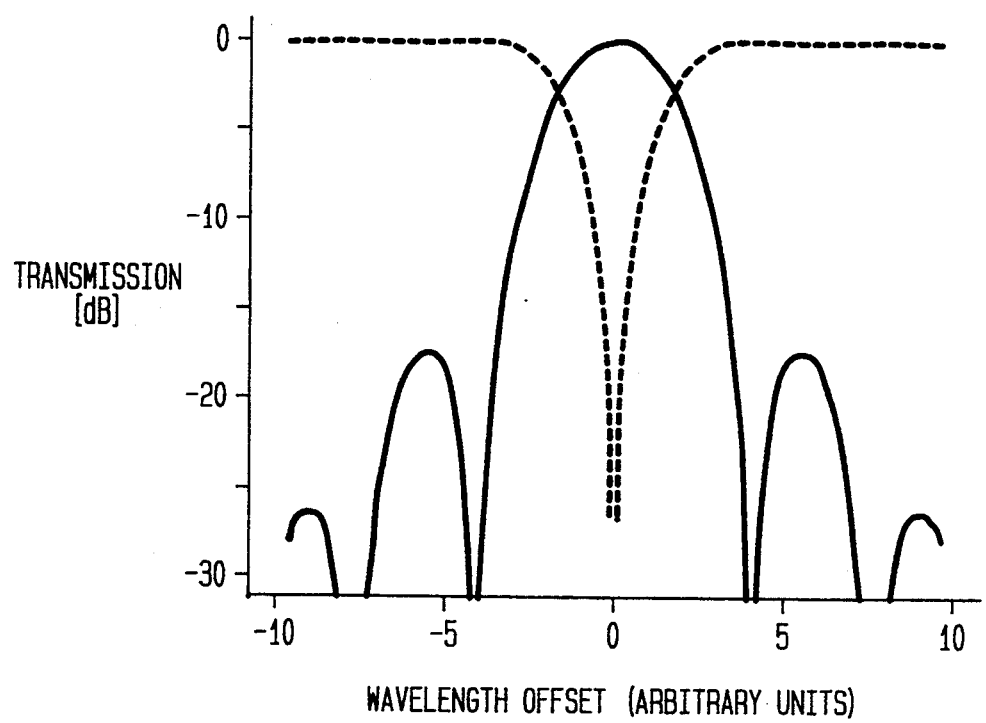
FIGS. 2A and 2B show calculated responses of the prior art apodized polarization converter and the passband-flattened polarization converter of the present invention, respectively.
Figure 2B:
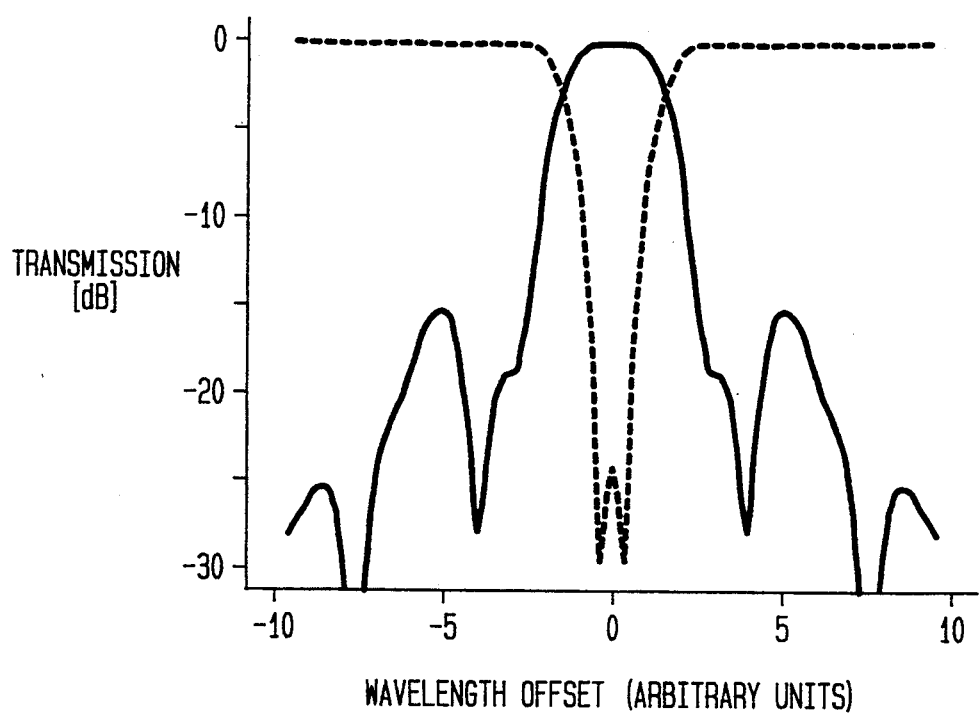

It has been demonstrated that the converter of the present invention has an advantageously flattened passband as compared with the prior art device. FIGS. 2A and 2B show the calculated responses of the prior art apodized converter and the passband-flattened converter of the present invention, respectively. The passband-flattened converter has assumed a value of $\delta=0.2$ and filter length of $2L_x$. The solid curves in both figures show the calculated polarization converted power intensity versus wavelength offset, and the dotted curves show the calculated power intensity remaining in the original polarization state versus wavelength offset. As can be noted, the calculated response of the polarization converter of the present invention has the desired flattened top as compared to the prior art apodized converter. Calculations show that there is little degradation of filter performance when the filter length deviates slightly from an integer number of $L_x$, thus not requiring the length of the interaction region following the partial absorber to be precisely equal to $L_x$.

It has been assumed in the calculations that acoustic absorption takes place over a distance much shorter than $L_x$ and that no acoustic phase change is introduced by the absorber. Both of these conditions are satisfied in fabricated experimental devices, to be described below. A complete acoustic absorber can be created using a stripe of rubber cement ~1 mm wide, which is substantially shorter than the 18 mm value of $L_x$ measured in the experimental devices, and partial absorbers are even narrower. In addition, measurements made over a wide range of acoustic absorption values showed no acoustic phase shifts, which would have otherwise degraded performance.

EXAMPLE

An acousto-optic converter was fabricated and tested for RF frequencies of $175\pm15$ MHz and optical wavelength of approximately 1.5 $\mu$m in LiNbO$_3$. The acoustic barriers 16 and 22 and the gap 18 were formed following the technique disclosed by Frangen et al. in "Integrated Optical, Acoustically Tunable Wavelength Filter," *Electronics Letters,* volume 25, 1989, pp. 1583–1584. Stripes of Ti were deposited along the y-direction on an x-cut LiNbO$_3$ substrate to a thickness of 180 nm and patterned into the barriers 16 and 22 and gap 18. The barriers 16 and 22 had widths of 150 $\mu$m and the acoustic waveguides 14 and 20 had widths of 100 $\mu$m separated by a gap 18 of 20 $\mu$m. the total length of the interaction region was 34 mm, slightly less than the ideal $2L_x$ of 36 mm. The titanium was diffused into the LiNbO$_3$ following the technique disclosed by Voges et al. in "Integrated-Optic Devices on LiNbO$_3$ for Optical Communication," *Journal of Lightwave Technology,* volume LT-5, 1987, pp. 1229–1237. Specifically, the substrate was placed in a platinum crucible and heated in an air ambient to 1050° C. After a first diffusion step lasting for approximately 20 hours, two additional stripes of Ti having a thickness of 95 nm and a width of 8 $\mu$m were deposited in the middle of the two acoustic waveguides 14 and 20. One corresponded to the illustrated optical waveguide 24. The other was placed in the center of the launching acoustic waveguide 14 in order to advantageously make it symmetric with the interaction acoustic waveguide 20 and was not otherwise used. Then another diffusion step was performed for 10 hours at the same temperature. The result is a shallow optical waveguide in a deeper acoustic waveguide.

The transducer 12 had 20 pairs of fingers on 20 $\mu$m periods with widths and separations of 5 $\mu$m. The fingers were inclined at 5° from the perpendicular of launching waveguide 14 on x-cut LiNbO$_3$, in accordance with the teachings in the patent of Cheung et al. The transducer 12 was formed by depositing a 15 nm adhesion layer of Ti and then 150 nm of Au and was designed so that the finger electrodes do not cross the interaction waveguide 20. RF power was coupled into the transducer 12 through a 180 nH series inductor. The partial acoustic absorber 27 was formed by placing a small amount of rubber cement or photoresist over the acoustic waveguides. Almost any value of $\delta$ can be created in this way, although reproducibility is difficult when the absorber is placed by hand. It would be expected that reproducibility can be improved using photolithographic techniques. The output acoustic absorber 26 was formed by depositing a 1 mm width of rubber cement over and transverse to the acoustic waveguides 14 and 20. As previously noted, an input acoustic absorber 34 was placed in back of the transducer 12 to prevent a back-propagating surface acoustic wave.

The behavior of polarization converters constructed as described above were measured by introducing light of 1530–1560 nm from an erbium-doped fiber amplifier (EDFA) into the optical waveguide 24, driving the transducer 12 with a constant RF frequency (which could be varied over the range 172–176 MHz, to select any optical wavelength in the EDFA spectrum), and observing transmission in both the original polarization (bar state) and the target polarization (cross state) using an optical spectrum analyzer. Acoustic absorption was monitored using a second SAW transducer (not shown) at the output end of the converter. The selected wavelength could be varied across this wavelength range with no change in the shape of the polarization converter response.

Figure 4A:
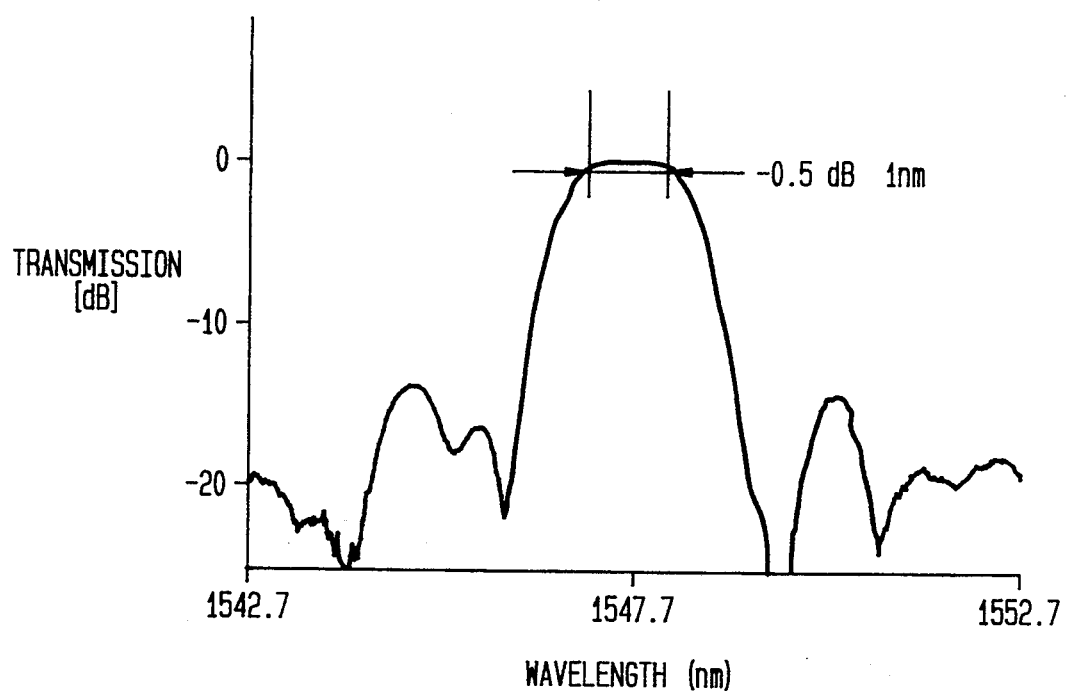
FIG. 4A and 4B show a detailed view of a portion of the curves in FIG. 3B.
Figure 4B:
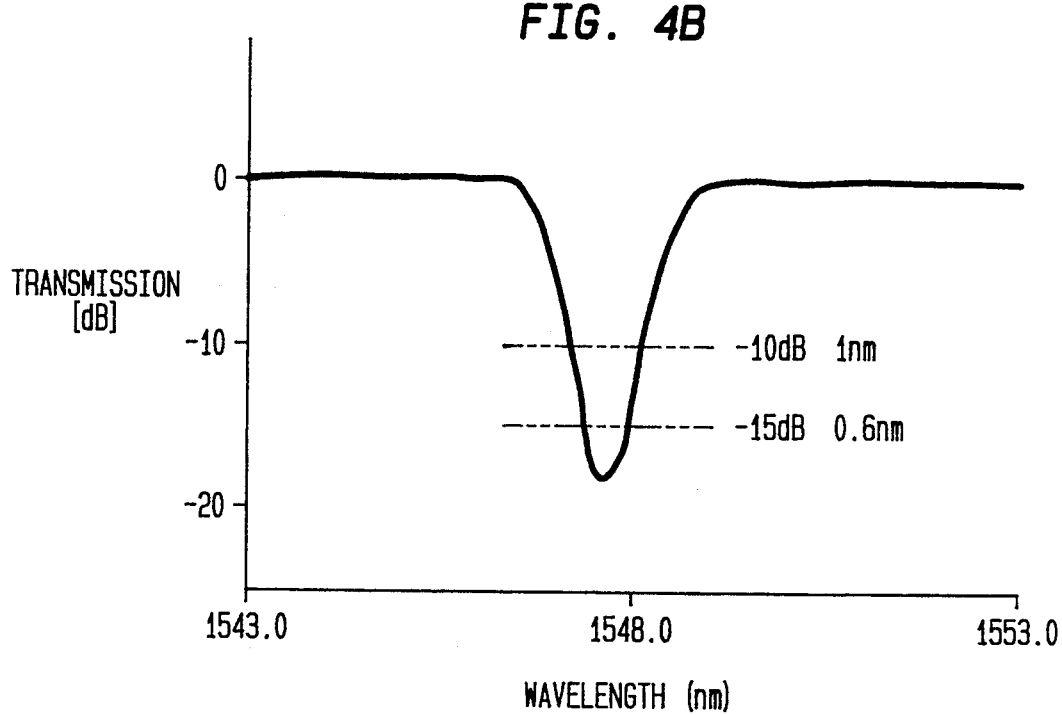

FIG. 3A shows the measured cross state and bar state transmissions for the prior art apodized converter and FIG. 3B shows the measured cross state and bar state transmissions for the passband-flattened converter of the present invention with a measured $\delta \sim 0.16$ and having the same crossover length. FIG. 4A and 4B show detailed views of portions of the curves in FIG. 3B. Both the polarization converter of the present invention and the prior art apodized polarization converter have a 3-dB passband of approximately 1.75 nm, but as FIG. 4A and 4B show, the passband-flattened device has a 1-nm-wide region in the cross state in which transmission varies by less than 0.5 dB and a correspondingly broadened depletion (1 nm wide at $-10$ dB) in the bar state; even at $-15$ dB the depletion width is $>0.5$ nm. The maximum bar state rejection depth of $-17$ dB is nearly identical to that of the prior art apodized converter, but the region of usefully high rejection (i.e., low transmission) is much wider in the passband-flattened device. For this device, the highest side lobe is $\sim -13$ dB; side lobes as low as $-15$ dB (near the calculated limit) have been observed in some flattened devices.

The side lobe height is determined by the value of $\delta$, and by the placement of the partial absorber 27; an absorber incorrectly placed produces higher side lobes, as does one producing large $\delta$. Too large an absorber (i.e., small $\delta$) does not increase the side lobe level, but does not produce appreciable flattening: as $\delta \rightarrow 0$, the response approaches that of the prior art apodized filter. Best results can be achieved with $0.15 \leq \delta \leq 0.2$, corresponding to between 98% and 96% absorption. Side lobes can also be increased by temperature- or processing-induced birefringence variations in the optical waveguide. It is reasonable to assume that these imperfections are the reason that even the prior art apodized polarization converter side lobes are higher than calculations would lead one to expect.

Placement of the partial absorber 27 at $L_x = L_c/2$, is important from both the flattening and side lobe magnitude standpoint. Small deviations from the optimum location will still yield a flattened response but not to the same degree as at the optimum location. Also, as noted, higher side lobes will be produced.

As previously noted, an interaction length of $2L_x$ is most desirable from a passband-flattening standpoint, with a slightly shorter interaction length giving flattening to a lesser degree. Further flattening can be achieved by increasing the interaction length by multiples of $L_x$, with partial absorbers being located at each intermediary $L_x$ location. Flattening will be thus be improved, for example, with an interaction length of $3L_x$, with partial absorbers being located at $L_x$ and $2L_x$, and a complete absorber being located at the end of the converter at $3L_x$. The penalty, of course, is the increased length of the converter.

Like the prior art apodized polarization converter, the passband-flattened polarization converter of the present invention has excellent TE/TM conversion efficiency. Depletion of the original polarization (i.e., bar state transmission at the peak conversion wavelength) was typically $-17$ dB for these converters. Theoretical values of depletion should be better than $-20$ dB; however, such efficiency was seen in only a few of the filters with the discrepancy being likely due to variations in optical waveguide birefringence.

The acoustic power required by passband-flattened polarization converters is only slightly higher than that needed by the prior art converters. For the range of $\delta$ giving the best flattening, required acoustic powers are increased by $\sim 25\%$, from 15 dBm to 16 dBm for converters of length $2L_x$, for $L_x = 18$ mm; filters having higher $\delta$ values require higher acoustic powers. The measured acoustic powers were in good agreement with those given by simulations. The acoustic power is $\propto 1/L_x^2$.

The passband flattened polarization converter of the present invention extends their utility of such devices in switches and filters, where the wavelength to be switched or filtered is poorly defined, time-varying (due, for example, to temperature drift) or subject to chirp. Passband flattening also make it possible to concatenate several filters, as may be necessary in a WDM system, with minimal narrowing of the composite filter response.

Figure 5:
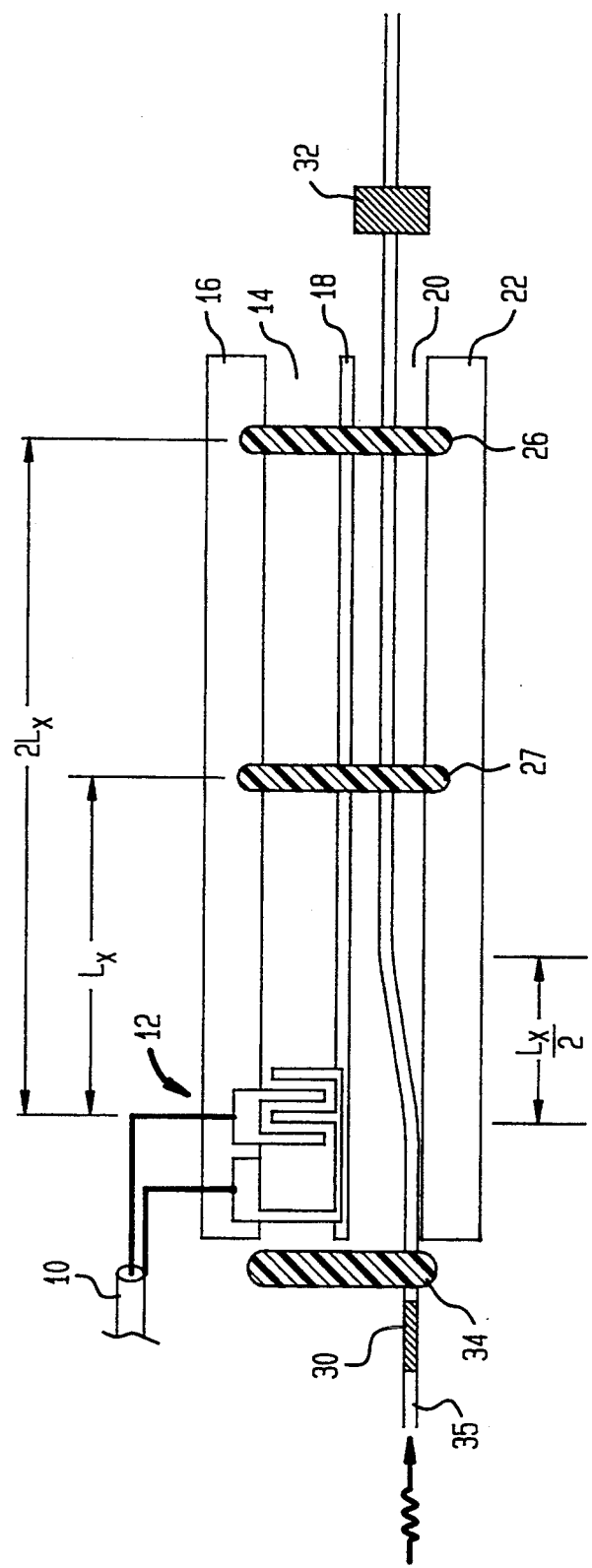
FIG. 5 is a plan view a second embodiment of the invention which reduces the magnitude of the side lobes.

With reference to FIG. 5, another embodiment of the present invention is shown in plan view. In this embodiment a more gradual onset of the acousto-optic interaction is effected in order to decrease the polarization conversion at the first side lobe, without increasing the length of the device. The same numerical reference numbers are used for those elements common to the embodiment shown in FIG. 1. In FIG. 5, instead of straight optical waveguide 24 being disposed in the center of the interaction acoustic waveguide 20, the optical waveguide 35 in FIG. 5 is disposed at $x = 0$, close to wave barrier 22, gradually curving towards the center of the interaction waveguide. At $L_x/2$ when the acoustic power has been completely coupled to the interaction waveguide, the optical waveguide is at the center and remains there. Since the acoustic amplitude has a maximum in or near the center of the interaction waveguide, this tapers the acousto-optic interactions. For example, if the acoustic amplitude in the first $L_x/2$ portion is $\sim \sin(\pi y/w)$, where y is the vertical distance measured from the center of the interaction waveguide and w is the waveguide width, then the interaction and therefore the coupling of polarizations is $\propto \sin^2$ along the length over this part of the converter. The acoustic amplitude in the interaction waveguide can thus be given as:

$$A \propto \sin^2(\pi x/L_x) \quad x \leq L_x/2 \qquad (4)$$

$$A \propto \sin(\pi x/L_x) \quad L_x/2 < x \leq L_x \qquad (5)$$

$$A \propto \delta \sin(\pi x/L_x) \quad L_x < x \leq 2L_x \qquad (6)$$

This has been mathematically shown to reduce side lobes by $\sim 1\frac{1}{2}$ dB, a small but possibly significant improvement.

The above-described embodiments are illustrative of the principles of the present invention. Other embodiments can be devised by those skilled in the art without departing from the spirit and scope of the present invention.

What is claimed is:

1. An acousto-optic polarization converter, comprising:
    a first acousto-optic waveguide formed in a piezoelectric substrate;
    a second acoustic waveguide formed in said substrate and separated from said first acoustic waveguide in an interaction region by a gap supporting only an evanescent acoustic wave and across which acoustic power is coupled between said first and second acoustic waveguides along an interaction length;
    launching means for launching a first acoustic wave into said interaction region of said first acoustic waveguide;
    an optical waveguide formed in and extending along said interaction region of said second acoustic waveguide;
    a first partial acoustic absorber formed over said first and second acoustic waveguides and being spaced from said launching means along said interaction region by a crossover length such that said acoustic wave is transferred from said first acoustic waveguide to said second acoustic waveguide and back to said first acoustic waveguide in said crossover length, the interaction length being greater than the crossover length; and
    a complete acoustic absorber formed over said first and second acoustic waveguides and being spaced from said launching means along said interaction region by the interaction length.

2. An acousto-optic polarization converter in accordance with claim 1 wherein said interaction length is approximately twice said crossover length.

3. An acousto-optic polarization converter in accordance with claim 1 wherein said first partial acoustic absorber absorbs most of the power of the acoustic wave.

4. An acousto-optic polarization converter in accordance with claim 3 wherein said first partial acoustic absorber absorbs between about 96% and 98% of the power of the acoustic wave.

5. An acousto-optic polarization converter in accordance with claim 1 comprising a total of N partial acoustic absorbers formed over said first and second acoustic waveguides, each spaced along said interaction region by a crossover length, the interaction length being greater than N times the crossover length.

6. An acousto-optic polarization converter in accordance with claim 5 wherein said interaction length is approximately equal to (N+1) times the crossover length.

7. An acousto-optic polarization converter in accordance with claim 1 further comprising means for gradually effecting onset of an acousto-optic interaction.

8. An acousto-optic polarization converter in accordance with claim 7 wherein said means for gradually effecting onset comprises curving the optical waveguide within a portion of the interaction region of the second acoustic waveguide.

9. An acousto-optic polarization converter in accordance with claim 8 wherein the optical waveguide is curved between the beginning of the interaction region and one-half the crossover length along the interaction region.

10. An acousto-optic polarization converter in accordance with claim 1 wherein said first launching means comprises an interdigitated transducer formed over said first acoustic waveguide.

11. An acousto-optic polarization converter comprising:
    a surface acoustic wave directional coupler comprising a first acoustic waveguide and a second acoustic waveguide, wherein said coupler couples an acoustic wave propagating in said first acoustic waveguide to said second acoustic waveguide and back to said first acoustic waveguide along a first direction for a crossover length portion of a total interaction length, and then coupling the acoustic wave back from said first acoustic waveguide to said second acoustic waveguide and back to said first acoustic waveguide for the remainder of the interaction length, wherein the acoustic amplitude in the second acoustic waveguide varies from a minimum value to a maximum value and back to said minimum value for said crossover length portion of the interaction length and then varies again from said minimum to an attenuated phase reversed maximum and back to said minimum for the remainder to the interaction length;
    a transducer disposed on said first acoustic waveguide; and
    an optical waveguide extending in and parallel to said second acoustic waveguide.

12. An acousto-optic polarization converter in accordance with claim 11 wherein said interaction length is approximately twice said crossover length.

13. An acousto-optic polarization converter in accordance with claim 11 wherein the absolute value of the attenuated phase reversed maximum of the acoustic amplitude in the portion of the interaction length following the crossover length portion is between about 0.15 and 0.2 times the maximum of the acoustic amplitude in the crossover length portion.

* * * * *